United States Patent
Fukushi et al.

(10) Patent No.: US 7,281,756 B2
(45) Date of Patent: Oct. 16, 2007

(54) AUTOMOTIVE REAR BODY STRUCTURE

(75) Inventors: Yoshinori Fukushi, Wako (JP); Mikio Shibaoka, Wako (JP); Kenji Ohkura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 11/379,152

(22) Filed: Apr. 18, 2006

(65) Prior Publication Data

US 2006/0249989 A1 Nov. 9, 2006

(30) Foreign Application Priority Data

May 9, 2005 (JP) .............................. 2005-135733

(51) Int. Cl.
*B60J 7/00* (2006.01)
(52) U.S. Cl. ................... 296/203.04; 296/204
(58) Field of Classification Search ........... 296/203.04, 296/204, 203.01
See application file for complete search history.

(56) References Cited

U.S. PATENT DOCUMENTS

| | | | | |
|---|---|---|---|---|
| 4,789,199 A | * | 12/1988 | Komatsu | 296/204 |
| 4,950,025 A | * | 8/1990 | Yoshii | 296/203.04 |
| 5,174,628 A | * | 12/1992 | Hayatsugu et al. | 296/204 |
| 5,580,121 A | * | 12/1996 | Dange et al. | 296/203.04 |
| 5,788,322 A | * | 8/1998 | Wolf et al. | 296/203.04 |
| 5,829,824 A | * | 11/1998 | Yamamuro et al. | 296/204 |
| 6,648,401 B2 | * | 11/2003 | Behnke et al. | 296/203.04 |
| 7,021,703 B2 | * | 4/2006 | Yamaguchi et al. | 296/203.04 |
| 7,083,225 B2 | * | 8/2006 | Yakata et al. | 296/203.04 |

FOREIGN PATENT DOCUMENTS

JP 7-309252 11/1995
JP 8-216927 8/1996

* cited by examiner

*Primary Examiner*—Kiran B. Patel
(74) *Attorney, Agent, or Firm*—Rankin, Hill, Porter & Clark LLP

(57) ABSTRACT

Provided is an automotive rear body structure which can effectively increase the torsional and bending rigidity of a rear part of the automotive body. A damper stiffener 21 is attached to an outer wall of each wheel house inner 15a so as to jointly define a closed cross section. A floor cross member 22 is attached to the outer walls of floor frames 14 and a rear floor panel 6 so as to jointly define a closed cross section. Each damper stiffener 21 extends to such an extent that its lower end overlaps with the upper end of the corresponding floor frame 14 and is spot welded to the corresponding wheel house inner 15a along with the floor cross member 22. Thereby, a closed cross section frame 23 having ridge lines 1 and 1' continually extending from the bottom wall of the trunk room 13 to each side wall thereof firmly connects the right and left wheel houses 15 and the rear floor panel 6 to the floor frames 14.

8 Claims, 3 Drawing Sheets

AUTOMOTIVE REAR BODY STRUCTURE

TECHNICAL FIELD

The present invention relates to an automotive rear body structure which can effectively increase the rigidity of a rear part of an automotive body.

BACKGROUND OF THE INVENTION

An automotive suspension system essentially consists of a suspension arm, a spring and a damper. The damper is placed in a wheel house typically in an upright orientation, and the upper end thereof is supported by the upper wall of the wheel house. Because the damper applies a vertical impulsive load on the wheel house as the automobile travels over an irregular road surface, if the rigidity of the wheel house is not adequate, the wheel house deforms, and this adversely affects the stability of the motion of the automobile. Therefore, it has been proposed to fit the outboard wall of the wheel house with a damper stiffener consisting of a frame member defining a closed cross section in cooperation with the outboard wall of the wheel house (Japanese patent laid open publication No. 07-309252).

Also, a rear wheel panel defining the floor of a trunk room is often fitted with a pair of floor frames attached to either side of the floor panel and a floor cross member each consisting of a frame member so that the trunk room floor may be provided with an adequate mechanical strength and rigidity that are required to withstand the load of rear seats and luggage (Japanese patent laid open publication No. 08-216927). The floor cross member and floor frames typically each consist of a channel member having a rectangular C-shaped cross section which is spot welded to the floor panel so as to jointly define a closed cross section. Each end of the floor cross member is spot welded to the inboard wall of the corresponding floor frame.

An automotive body, particularly a monocoque body is required to have an adequate torsional and bending rigidity for the automobile to have a desired motion stability and a high ride quality. However, the damper stiffener disclosed in Patent Document #1 may increase the rigidity of the wheel house, but is not effective in increasing the overall rigidity of the rear part of the body. The floor frames and the floor cross member disclosed in Patent Document #2 may be effective in increasing the rear floor panel, but are not very effective in increasing the overall rigidity of the rear part of the body. It was proposed to align the fore-and-aft positions of the damper stiffeners and the floor cross member with each other, but because the floor frames break the continuity between the closed cross section of each damper stiffener and the closed cross section of the floor cross member, the overall rigidity of the rear body part could not be effectively increased.

BRIEF SUMMARY OF THE INVENTION

In view of such problems of the prior art, a primary object of the present invention is to provide an automotive rear body structure which can effectively increase the torsional and bending rigidity of a rear part of the automotive body.

A second object of the present invention is to provide an automotive rear body structure which can effectively minimize the torsional and bending deformation of a rear part of the automotive body.

A third object of the present invention is to provide an automotive rear body structure which can effectively ensure a high rigidity of a rear part of the automotive body with a minimum amount of material.

These and other objects of the present invention can be accomplished by providing an automotive rear body structure including a rear floor panel and a pair of wheel houses provided on either side end of the rear floor panel, comprising: a damper stiffener attached to an outer wall surface of an inboard wall of each rear wheel house at least adjacent to an upper mount of a damper, each damper stiffener defining a closed cross section in cooperation with the inboard wall of the corresponding rear wheel house; and a floor cross member attached to a lower surface a rear floor panel, the floor cross member defining a closed cross section in cooperation with the rear floor panel; wherein each damper stiffener and the floor cross member are joined to each other in a mutually overlapping relationship so that a closed cross section frame extends from one rear wheel house to another in a continuous manner.

According to the present invention, because the right and left wheel houses and the rear floor panel are firmly joined to one another via a frame member having a closed cross section that continually extends from the bottom surface to each side surface, the torsional and bending rigidity of the rear body part is improved so that a high motion stability and a favorable ride quality can be achieved. Preferably, the closed cross section frame is provided with a substantially rectangular cross section so that ridge lines may extend continually from the bottom surface to each side surface for an added rigidity of the rear body part. Typically, the closed cross section frame is provided with a pair of flanges on either side thereof which are spot welded to the inboard walls of the rear wheel houses and the floor panel.

According to a preferred embodiment of the present invention, the inboard walls of the rear wheel houses and the rear floor panel jointly define a trunk room, and a floor frame extends in a fore-and-aft direction between the inboard wall of each rear wheel house and the rear floor panel, the closed cross section frame joining each inboard wall of the wheel house with the outboard wall of the corresponding floor frame.

Because the torsional and bending deformation of the rear body part is minimized owing to the increased rigidity of the trunk room, a high motion stability and a favorable ride quality can be achieved.

Preferably, each rear wheel house is formed by an wheel house outer and a wheel house inner, and an upper end of the corresponding damper stiffener is interposed between the wheel house outer and the wheel house inner. A rear inner panel may also be interposed, together with the upper end of the corresponding damper stiffener, between the wheel house outer and the wheel house inner of the corresponding wheel house. Thereby, the number of spot welded points may be minimized.

Preferably, the outboard wall of each floor frame, a lower end of the inboard wall of the corresponding wheel house, a lower end of the corresponding damper stiffener and a correspond end of the floor cross member are welded to each other along a common line extending in a fore-and-aft direction. Thereby, the number of spot welded points may be minimized.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
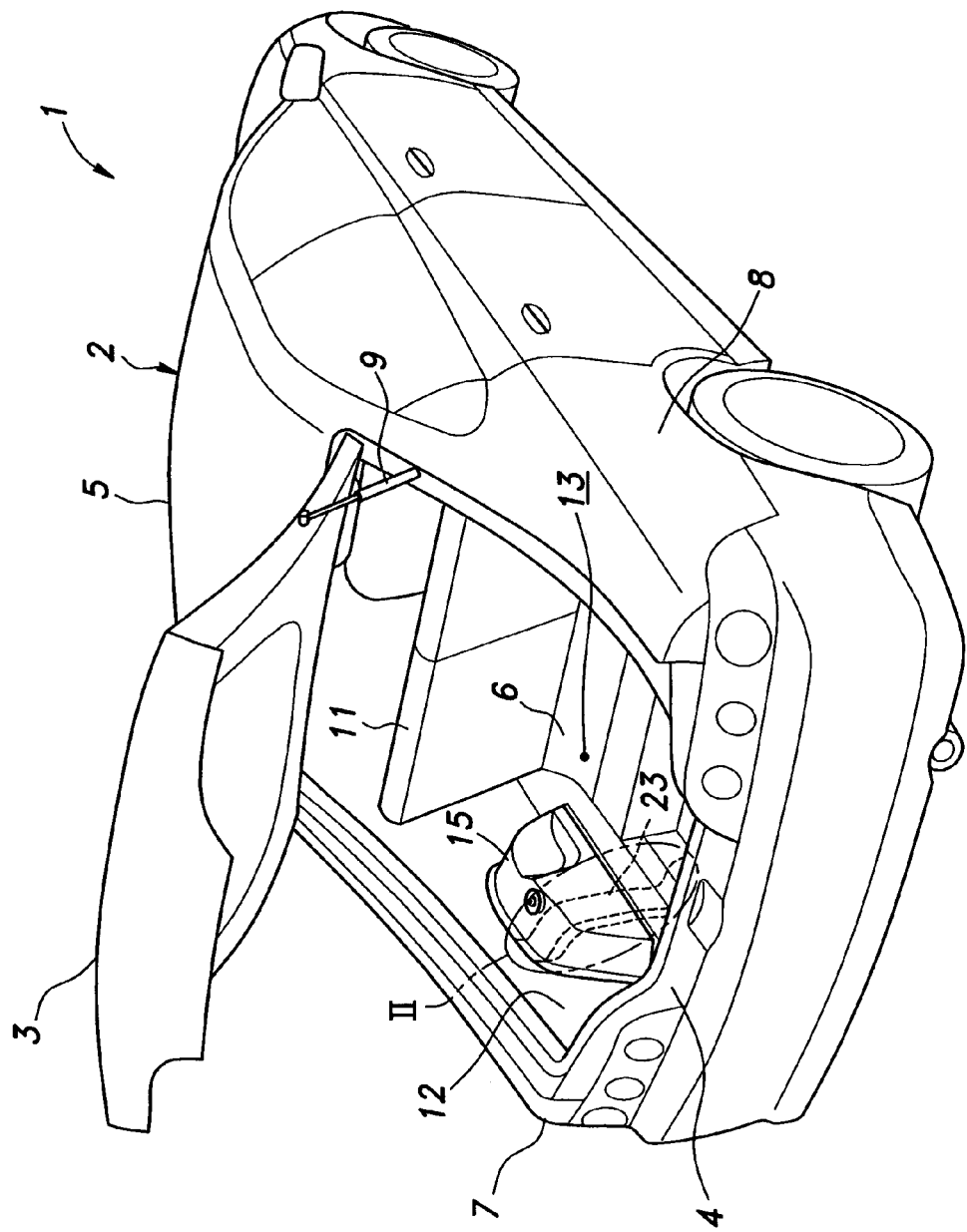
FIG. 1 is a perspective view of an automobile embodying the present invention.
Figure 2:
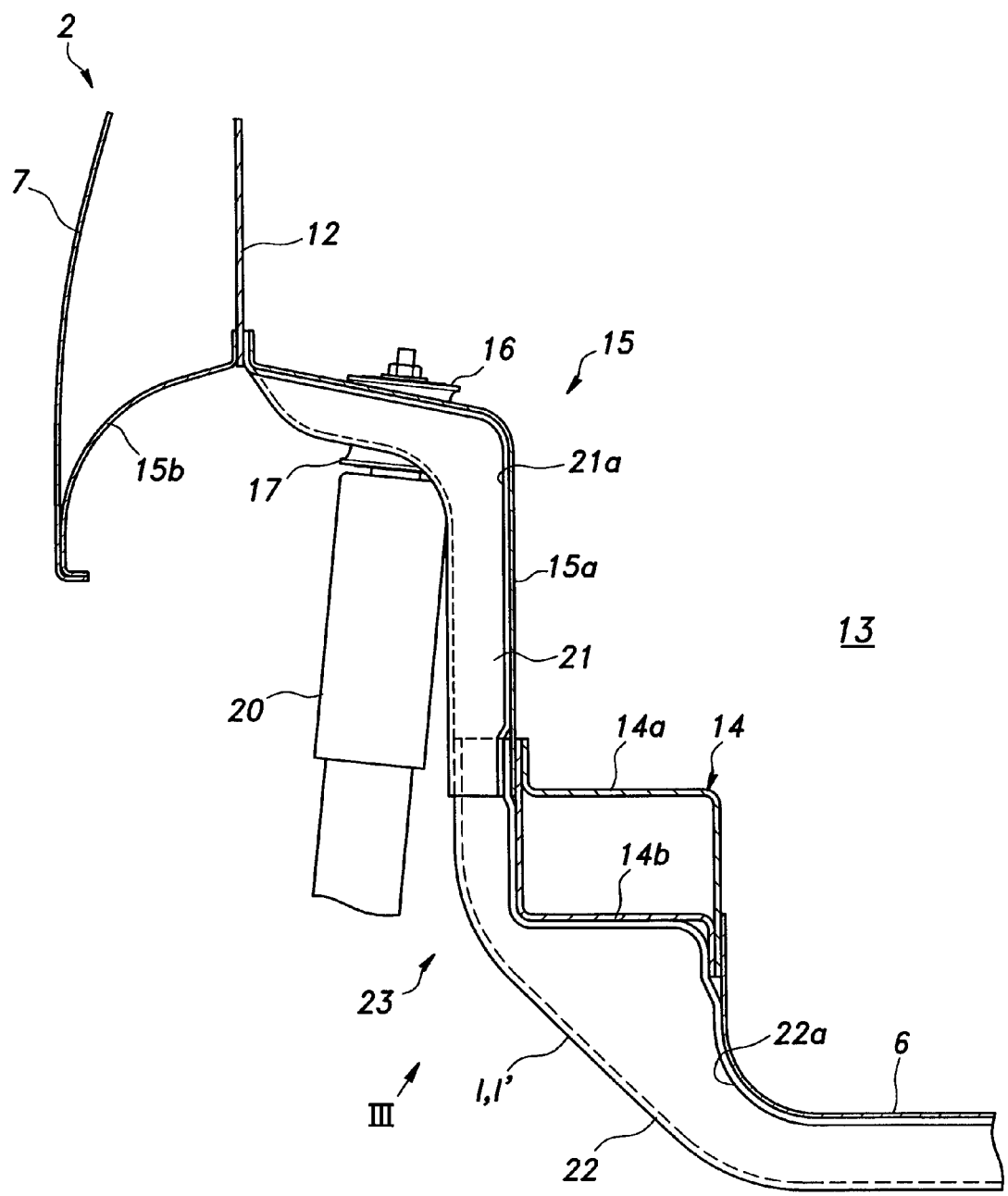
FIG. 2 is an enlarged longitudinal sectional view showing the part of Figure II indicated by FIG. 1.
Figure 3:
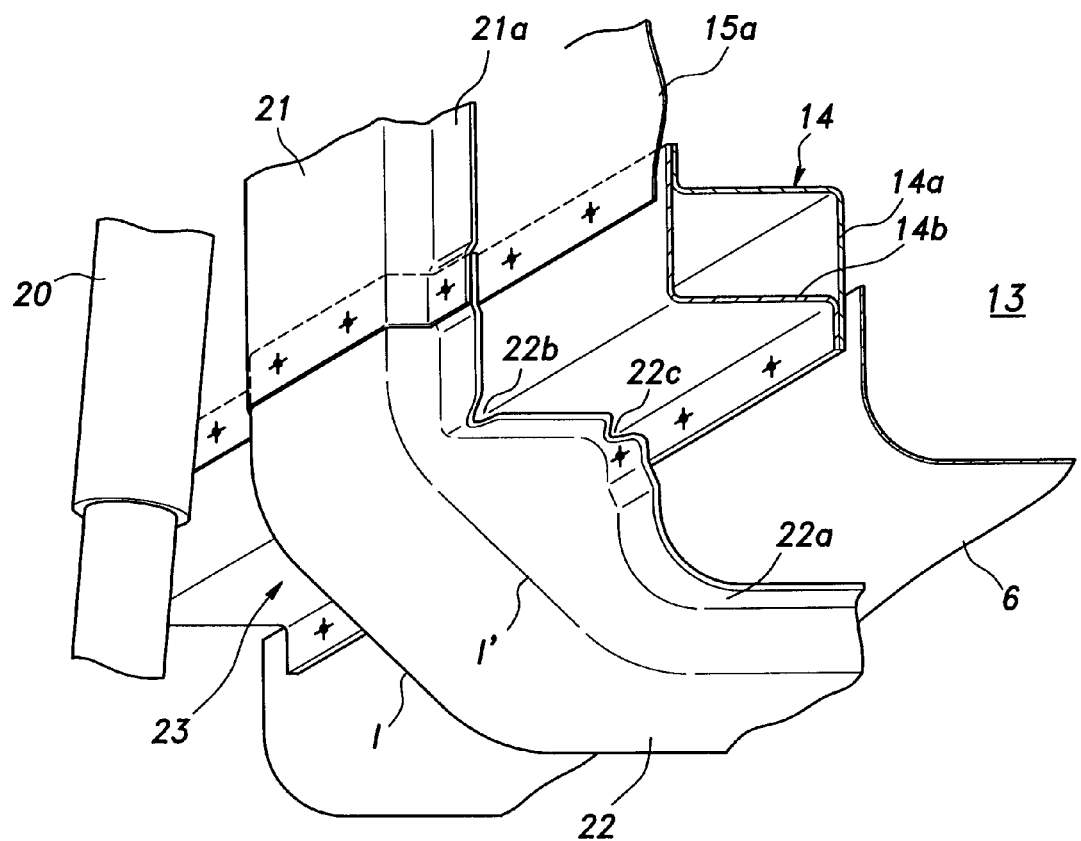
FIG. 3 is a view seem from the direction indicated by III in FIG. 2.

FIG. 1 is a perspective view of an automotive body embodying the present invention, and FIG. 2 is an enlarged view of a part of FIG. 1 indicated by II in FIG. 1 while FIG. 3 is a view as seem from the direction indicated by III in FIG. 2.

Referring to FIG. 1, the illustrated embodiment consists of four-door sedan in the form of a hatch back automobile 1 which is provided with a tailgate 3 in a rear end of a car body 2. The car body 2 consists of a monocoque body that is formed by spot welding together a rear panel 4, a roof panel 5, a rear floor panel 6 and a pair of outer panels 7 and 8. The tailgate 3 is attached to the rear end of the roof panel 5 via a hinge (not shown in the drawings) so as to swing upward around the hinge. A support strut 9 applies a force to the tailgate to keep it open. In FIG. 1, the carpet and trims in the trunk room are omitted from illustration to aid understanding.

Behind the rear seats is defined a trunk room 13 by the rear floor panel 6 and a pair of rear inner panels 12. As shown in FIGS. 2 and 3, on each side end of the trunk room 13 is provided a floor frame 14 having a rectangular cross section and formed by spot welding a floor frame inner 14a and a floor frame outer 14b to each other. The rear floor panel 6 is spot welded to the inboard wall of the floor frame 14 and a wheel house inner 15a is spot welded to the outboard wall of the floor frame 14. The wheel house inner 15a is spot welded to a wheel house outer 15b with the rear inner panel 12 interposed between them so as to form the wheel house 15.

The wheel house inner 15a supports the upper end of a damper 20 via a pair of damper mounting rubbers 16 and 17 in a resilient manner. The lower end of the damper 20 is connected to a suspension arm not shown in the drawings so that the damper 20 may control the oscillatory movement of the suspension arm owing to the vertical movement of the wheel.

To the part of the wheel house inner 15a immediately behind the damper 20 is attached a damper stiffener 21 defining a closed cross section jointly with the outboard wall of the wheel house inner 15a. The damper stiffener 21 consists of a rectangular C-shaped stamp formed steel plate, and is spot welded to an area of the wheel house inner 15a extending from the upper end to the lower end thereof via flanges 21a of the damper stiffener 21.

To the outboard walls of the right and left floor frames 14 and the rear floor panel 6 is attached a floor cross member 22 defining a closed cross section jointly with the outboard walls of the floor frames 14 and rear floor panel 6. The floor cross member 22 also consists of a rectangular C-shaped stamp formed steel plate, and is spot welded to an area extending over the right and left floor frames 14 (only the left floor frame 14 is shown in FIGS. 2 and 3) and the rear floor panel 6 via flanges 22a of the floor cross member 22. The flanges 22a of the floor cross member 22 are provided with notches 22b and 22c in the parts thereof corresponding to the corners of the floor frames 14 so as to facilitate the stamp forming (drawing) process of the floor cross member 22.

In the illustrated embodiment, each lateral end of the floor cross member 22 extends to the upper end of the floor frame 14. The lower end of each damper stiffener 21 extends beyond the upper edge of the floor frame 14 (or overlaps with the upper end of the floor frame 14) and is spot welded to the wheel house inner 15a together with the floor cross member 22. Therefore, in the illustrated automotive body, a frame 23 having a closed cross section extends along the bottom wall and side walls of the trunk room defining continuous ridge lines 1 and 1' over the entire length thereof. In other words, the right and left wheel houses 15 and the rear floor panel 6 are firmly attached to the floor frame 3 via this frame 23 having a closed cross section. In particular, the outboard wall 14b of each floor frame 14, a lower end of the wheel house inner 15a (inboard wall) 15a of the rear wheel house 15, a lower end of the damper stiffener 21 and the correspond end of the floor cross member 22 are welded to each other along a common line extending in a fore-and-aft direction. Thereby, the number of spot welded points may be minimized.

When an automobile travels over irregular road surfaces, the damper mount of the wheel house 15 is subjected to vertical loads. However, according to the illustrated embodiment, because the wheel house inner 15a is fitted with the damper stiffener 21, the bending deformation of the wheel house 15 can be effectively controlled, and a high motion stability can be achieved. When the automobile makes a turn, the body 2 is subjected to torsional and bending loads owing to the rolling of the body 2. According to the illustrated embodiment, because the closed cross section frame 23 having continuous ridge lines 1 and 1' that extend from the bottom part to the two side parts firmly connects the right and left wheel houses 15 and the rear floor panel 6 to the floor frames 14, the rigidity of the trunk room 13 is increased, and the torsional and bending deformations of the body 2 can be effectively controlled. As a result, a high motion stability and a favorable ride quality can be achieved, and noises and vibrations can be effectively controlled.

Although the present invention was described in terms of a preferred embodiment of the present invention, the present invention is not limited by the illustrated embodiment, and can be modified in a wide ranging manner. For instance, the illustrated embodiment was applied to the rear body structure of a four door sedan, but may also be applied to the rear body structure of other types of motor vehicles. The point of connection between the damper stiffener and floor cross member was located in the lower end of wheel house inner in the illustrated embodiment, but it is also possible to extend the damper stiffener and connect it to the floor cross member in a lower part of the floor frame. Also, the damper stiffener is placed over the floor cross member at the point of connection in the illustrated embodiment, but the floor cross member may also be placed over the damper stiffener at the point of connection. The specific shapes of the damper stiffener and floor cross member can be freely modified without departing from the spirit of the present invention.

The contents of the original Japanese patent application on which the Paris Convention priority claim is made for the present application are incorporated in this application by reference.

The invention claimed is:

1. An automotive rear body structure including a rear floor panel and a pair of wheel houses provided on either side end of the rear floor panel, comprising:

a damper stiffener attached to an outer wall surface of an inboard wall of each rear wheel house at least adjacent to an upper mount of a damper, each damper stiffener defining a closed cross section in cooperation with the inboard wall of the corresponding rear wheel house; and a floor cross member attached to a lower surface a rear floor panel, the floor cross member defining a closed cross section in cooperation with the rear floor panel;

wherein each damper stiffener and the floor cross member are joined to each other in a mutually overlapping relationship so that a closed cross section frame extends from one rear wheel house to another in a continuous manner.

2. The automotive rear body structure according to claim 1, wherein the inboard walls of the rear wheel houses and the rear floor panel jointly define a trunk room, and a floor frame extends in a fore-and-aft direction between the inboard wall of each rear wheel house and the rear floor panel, the closed cross section frame joining each inboard wall of the wheel house with the outboard wall of the corresponding floor frame.

3. The automotive rear body structure according to claim 1, wherein each rear wheel house is formed by an wheel house outer and a wheel house inner, and an upper end of the corresponding damper stiffener is interposed between the wheel house outer and the wheel house inner.

4. The automotive rear body structure according to claim 3, further comprising a pair of rear inner panels each of which is interposed, together with the upper end of the corresponding damper stiffener, between the wheel house outer and the wheel house inner of the corresponding wheel house.

5. The automotive rear body structure according to claim 1, wherein the closed cross section frame is provided with a pair of flanges on either side thereof which are spot welded to the inboard walls of the rear wheel houses and the floor panel.

6. The automotive rear body structure according to claim 2, wherein the closed cross section frame is provided with a pair of flanges on either side thereof which are spot welded to the inboard walls of the rear wheel houses, the floor panel and outboard walls of the floor frames.

7. The automotive rear body structure according to claim 2, wherein the outboard wall of each floor frame, a lower end of the inboard wall of the corresponding wheel house, a lower end of the corresponding damper stiffener and a correspond end of the floor cross member are welded to each other along a common line extending in a fore-and-aft direction.

8. The automotive rear body structure according to claim 1, wherein the closed cross section frame is provided with a substantially rectangular cross section.

* * * * *